United States Patent [19]

Heinz

[11] 4,043,621

[45] Aug. 23, 1977

[54] REPLACEABLE SLIP RING ROTOR

[76] Inventor: Richard A. Heinz, 76 Woodhaven Road, Glastonbury, Conn. 06033

[21] Appl. No.: 564,370

[22] Filed: Apr. 2, 1975

[51] Int. Cl.² .................... F16C 32/00

[52] U.S. Cl. .................... 308/189 R; 310/232

[58] Field of Search .............. 308/207 R, 184 R, 188, 308/189 R; 310/232, 237, 247

[56] References Cited

U.S. PATENT DOCUMENTS

| | | | |
|---|---|---|---|
| 2,548,307 | 4/1951 | Hall | 310/232 |
| 3,185,951 | 5/1965 | Beau | 310/232 |
| 3,514,653 | 5/1970 | Kendall | 310/232 |

*Primary Examiner*—Richard A. Bertsch

[57] ABSTRACT

A slip ring device including a metallic sleeve inside an insulated rotor assembly consisting of conductive rings. A friction fit between the metallic sleeve and metallic supporting shaft drilled in such a manner as to accommodate electrical leads routed out through the center of the shaft. A metallic sleeve supporting the insulated conductive rings positioned by a step in the supporting shaft diameter and not cemented to the supporting shaft so that it can easily be replaced without requiring the main rotor support shaft to be replaced.

3 Claims, 1 Drawing Figure

REPLACEABLE SLIP RING ROTOR

BACKGROUND OF THE INVENTION

In the development of high speed turbine engines, there has been a long standing need for a high performance slip ring for continuously transferring electrical signals from strain gages, thermocouples and the like that can be easily and quickly restored to peak performance. It is inherent in the nature of a slip ring to eventually reach objectionable wear levels on those components, such as rings, brushes, and bearings, that are essential to quality performance. The usual approach to this problem is to replace the complete slip ring assembly because the rotating conductors are cemented to the supporting shaft or of a molded construction which is integral with the shaft or to require time consuming and highly skilled labor to carefully rebuild the rotor with new individual rings and insulation components, and even then some slip ring designs themselves do not provide for proper dimensional control during operation under adverse conditions of temperature and vibration because of their method of construction.

SUMMARY OF THE INVENTION

This invention describes a slip ring rotor assembly that can be replaced without the disadvantages of the prior art of having to replace the rotor supporting shaft along with the ring assembly by providing a relatively simple and inexpensive means to accomplish assembly and replacement of a rotor greatly improved over prior art devices.

The invention also provides a device wherein the method of fabrication is simplified by using a core metal tube which provides the necessary dimensional control over critical ring spacing and bearing loading.

The invention further provides additional rigidity through the use of the metal tube which provides friction damping of the ring assembly against the supporting rotor shaft.

In the preferred embodiment, the invention consists of a consumable ring assembly which is built over and bonded to a metal core tube. This tube, which facilitates manufacture, is integrated into the design of the rotor assembly to provide an easily replaceable ring assembly while maintaining the necessary control over critical ring position and bearing spacing and therefore loading during assembly and operation. The metal core tube also imparts additional rigidity to the rotor assembly while providing vibration damping.

BRIEF DESCRIPTION OF THE DRAWING

An understanding of the invention will become more apparent to those skilled in the art by reference to the following detailed description when viewed in light of the accompanying drawing wherein is shown a partial section view of a slip ring showing the relationship of the removable ring assembly to the supporting slip ring structure.

DESCRIPTION OF THE PREFERRED EMBODIMENTS

Figure 1:
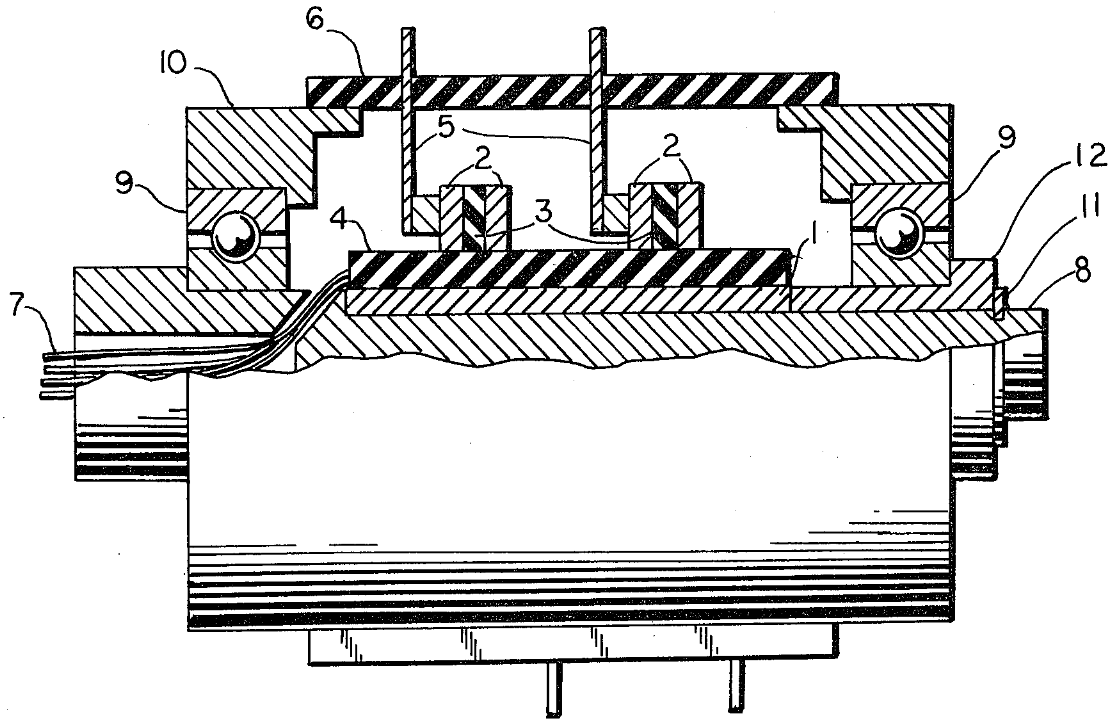

As shown in FIG. 1, a removable slip ring assembly consists of a metal tube 1 on to which is bonded a series of metallic rings 2 separated by insulators 3. These rings which act as conductors for continuously transferring electrical signals from the rotating rings to the stationary brushes and hence to suitable monitoring, control or recording equipment assemblies are spaced apart by additional insulating material 4 to provide tracks for the brushes or wipers 5 which contact the face of the metallic rings. The brushes are supported by brush blocks 6. Wires 7 are connected to the rings and are routed through the slip ring rotor assembly and away to be connected to appropriate electrical devices, typically but not necessarily limited to strain gages or thermocouples, which are also rotating at the same speed on an adjacent shaft of a test vehicle, for example the rotor of a gas turbine. The above described assembly, except for the brushes which necessarily do not rotate, easily slips over the main supporting slip ring shaft 8 which is in turn supported by the bearings 9 in a slip ring housing 10. Replacement of the consumable ring assembly, which in time will experience wear, is accomplished by removal of a shaft lock nut or snap ring 11 followed by the bearing support 12. At this point the bearings and slip ring assembly can be easily slipped off the main supporting rotor shaft and replaced with new components.

It should be understood that the present disclosure is for the purpose of illustration only and that this invention includes all modifications and equivalents which fall within the scope of the appended claims.

I claim:

1. A slip ring assembly for use with turbine engines and the like rotary devices, said assembly comprising a rotor assembly of metallic rings each connected to insulated leadwires and extending through said rotor assembly with said rings electrically isolated by bonding to insulating material between the axially spaced rings and between the rings and a cylindrical metallic supporting tube or sleeve which is designed to fit snugly over a metallic rotor structure but not bonded to said supporting rotor structure, said metallic rotor supporting structure provided with bearing means between said rotor assembly and a housing, housing means fully enclosing said rotor assembly and designed for assembly by inserting the said rotor assembly and supporting shaft axially into the housing with housing parts having electrically conductive brushes extending through insulated brush blocks to provide soldering terminals, said brushes positioned from diametrically opposed sides contacting alternate sets of said rings on the rotor assembly.

2. The assembly set forth in claim 1 wherein the cylindrical metal sleeve is held in position by the step in supporting metal shaft diameters and the rear bearing support and being metallic provides the necessary dimensional control over the axial bearing spacing and therefore bearing loading during adverse thermal operating conditions.

3. The assembly set forth in claim 1 wherein the cylindrical metal sleeve is bonded to and supports and positions the conductive rings and insulators during manufacture and maintains the positioning during operation.

* * * * *